T. E. MOFFITT.
HARNESS SNAP.
APPLICATION FILED OCT. 12, 1917.
1,271,348.
Patented July 2, 1918.
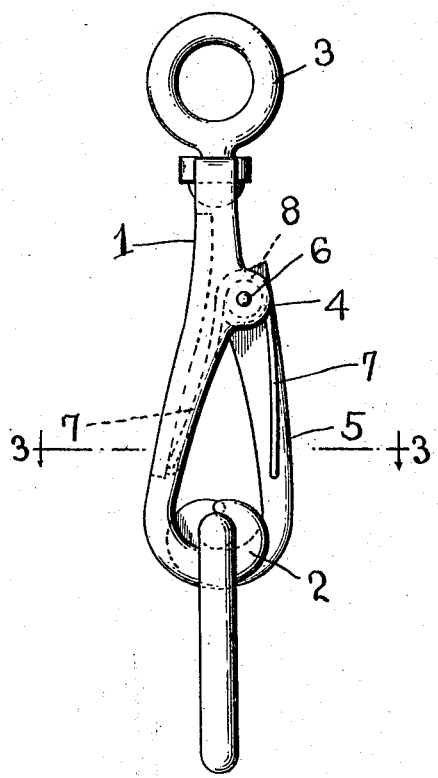
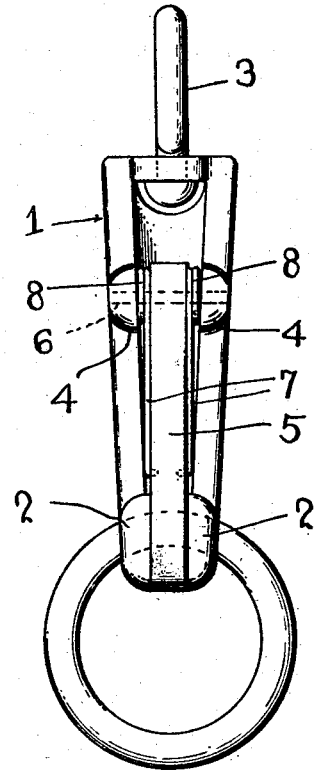
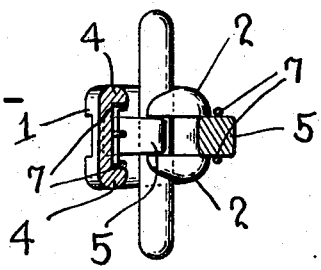
Witness
L. B. James
Inventor
Thomas E. Moffitt
By Victor J. Evans
Attorney

UNITED STATES PATENT OFFICE.

THOMAS E. MOFFITT, OF NACO, ARIZONA.

HARNESS-SNAP.

1,271,348.　　　　　Specification of Letters Patent.　　　Patented July 2, 1918.

Application filed October 12, 1917. Serial No. 196,287.

*To all whom it may concern:*

Be it known that I, THOMAS E. MOFFITT, a citizen of the United States, residing at Naco, in the county of Cochise and State of Arizona, have invented new and useful Improvements in Harness-Snaps, of which the following is a specification.

This invention relates to harness snap hooks and it consists in the novel features hereinafter described and claimed.

An object of the invention is to provide a snap hook which is of simple and durable structure and when the same is engaged with a ring it securely and effectually retains the same.

With this object in view the snap hook comprises a member having two spaced hooks mounted thereon and an eye pivotally connected with its shank. A second member is pivotally connected with the first mentioned member and is provided with a single hook which is adapted to operate and move between the first mentioned hooks. A spring is connected with both of the said members and is coiled around the pivot which joins them together and is under tension with a tendency to normally maintain the hook in closed position with relation to each other.

In the accompanying drawing:—

Figure 1 is a side elevation of the snap hook;

Fig. 2 is an edge elevation of the same.

Fig. 3 is a transverse sectional view of the same cut approximately on the line 3—3 of Fig. 1.

The snap hook comprises a member 1 which is provided at one end with spaced hooks 2. An eye 3 is pivotally connected with the other end of the said member 1. The member 1 is provided at its side edges with longitudinally disposed flanges 4 and a single hook 5 is pivotally connected with the member 1 by means of a pin 6, which passes transversely through the flanges 4 and one end portion of the hook 5. The bill end portion of the hook 5 lies between the hooks 2 and may move with relation to the same. A spring 7 is interposed between the member 1 and the hook member 5 and has a portion which bears against each of the said members. The spring 7 is provided at an intermediate point with coils 8 which encircle the pin 6 at the opposite sides of the hook member 5. The spring 7 is under tension with a tendency to normally maintain the hook member 5 in a closed position with relation to the hooks 2. The bills of the hooks 2 and the hook 5 are inwardly disposed so that when the hook 5 is in a closed position with relation to the hooks 2 the bill end portions of the said hooks will extend completely around the ring which is inserted between them. Also when the hook member 5 is swung to an outer position with relation to the hooks 2 the bill ends of the said hooks are inclined with relation to each other whereby the ring may be readily withdrawn from between the hooks by coming in contact with them and spreading them slightly with relation to each other. When it is desired to connect the ring with the bill ends of the hooks the ring is forced between the intermediate portions of the said bill ends whereby they are spread and then the hook member 5 is forced in an inward direction with relation to the hooks 2 whereby the bill ends of the hooks 2 are moved away from the bill end of the hook 5 and the said ring may fall between the bill ends of the hooks 2 and 5, after which the member 5 is released and the spring 7 comes into play whereby the bill ends securely grasp the ring between them.

From the foregoing description taken in conjunction with the accompanying drawing, it will be seen that a harness snap hook of simple and durable structure is provided and that the same may be easily and quickly manipulated to attach a ring to the same or to remove the ring therefrom.

Having described the invention what is claimed is:—

A snap hook comprising a member having a pair of spaced hook ends, a second member pivotally connected with the first mentioned hook member and having a single hook end adapted to operate between the first mentioned hook ends and a spring bearing against the said members and serving to hold the hook ends at normal positions with relation to each other, the extremities of the hook ends being inwardly directed toward their respective shanks.

In testimony whereof I affix my signature.

THOMAS E. MOFFITT.

Copies of this patent may be obtained for five cents each, by addressing the "Commissioner of Patents, Washington, D. C."